United States Patent [19]

Brawand

[11] 4,107,825
[45] Aug. 22, 1978

[54] TAG LINE AND BUTT HOOK CONSTRUCTIONS

[76] Inventor: Franklin M. Brawand, 7706 SW. Florence La., Portland, Oreg. 97223

[21] Appl. No.: 662,358

[22] Filed: Mar. 1, 1976

Related U.S. Application Data

[63] Continuation of Ser. No. 494,501, Aug. 5, 1974, which is a continuation of Ser. No. 354,696, Apr. 26, 1973, abandoned, which is a continuation of Ser. No. 192,087, Oct. 26, 1971, abandoned.

[51] Int. Cl.² .................. F16G 11/14; B66C 1/12
[52] U.S. Cl. ................. 24/115 R; 403/209; 294/74
[58] Field of Search ............... 24/115, 123 A, 115 R, 24/123 E; 294/74

[56] References Cited

U.S. PATENT DOCUMENTS

| | | | |
|---|---|---|---|
| 1,456,824 | 5/1923 | Olson | 24/123 A |
| 1,483,516 | 2/1924 | McIntosh | 24/123 A |
| 1,552,338 | 9/1925 | Munro | 24/123 A |
| 1,663,265 | 3/1928 | Benson | 24/123 A |
| 1,666,272 | 4/1928 | Spiering | 24/123 A |
| 1,786,081 | 12/1930 | Nourse | 24/123 A |
| 1,796,913 | 3/1931 | Wright | 24/123 A |
| 2,234,602 | 3/1961 | McIntosh | 24/123 A |
| 2,637,591 | 5/1953 | Maxfield | 24/123 A |
| 3,239,900 | 3/1966 | Bottons | 24/127 A |

Primary Examiner—Bernard A. Gelak
Attorney, Agent, or Firm—Klarquist, Sparkman, Campbell, Leigh, Hall & Whinston

[57] ABSTRACT

A plurality of butt hooks are secured to a tag line and receive ferrules on the tag line in positions blocking release passages in the butt hooks through which nubbins on the ends of choker lines must be moved to release the choker lines from the butt hooks. A sling construction includes butt hooks connecting a spreader bar to a pair of tag lines.

4 Claims, 9 Drawing Figures

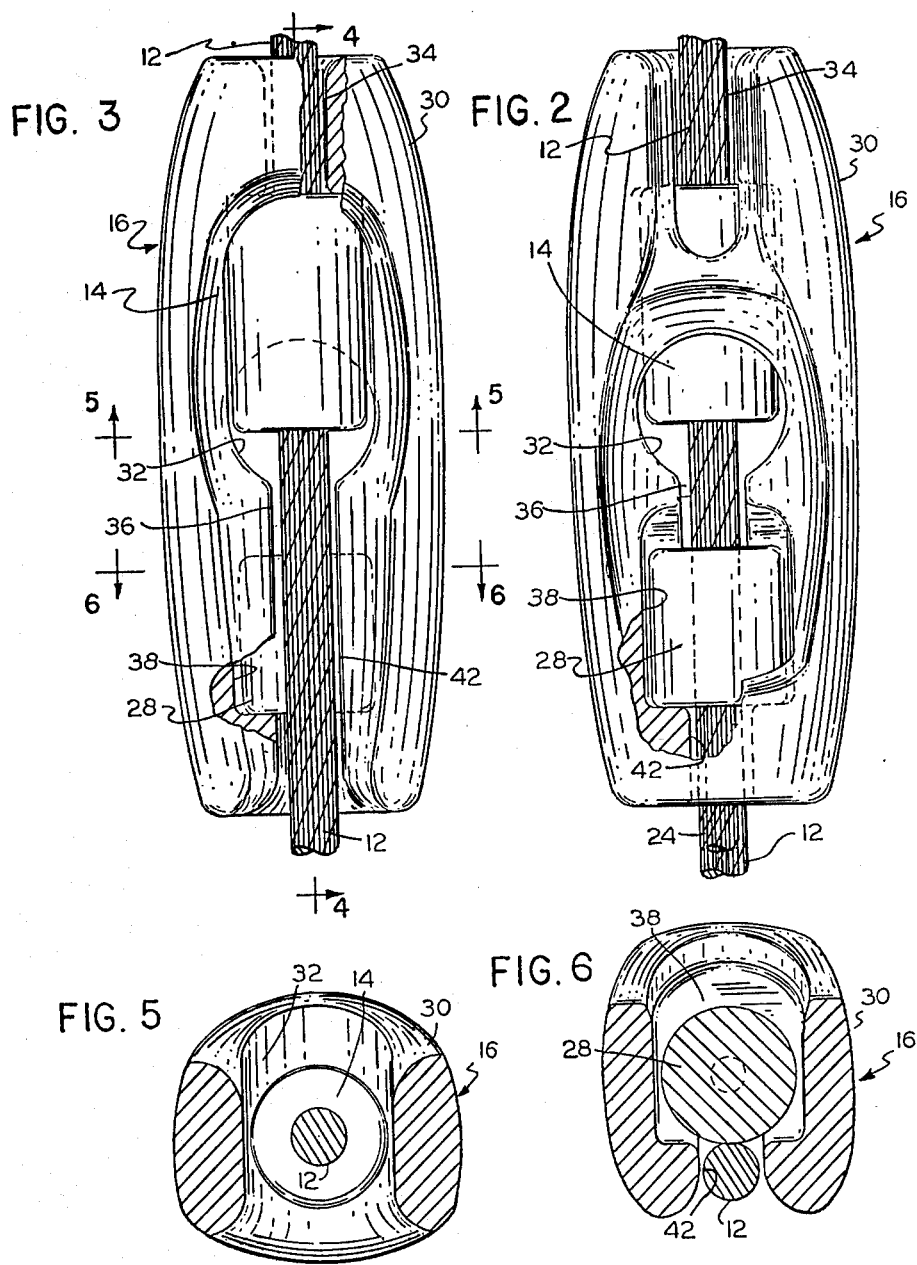

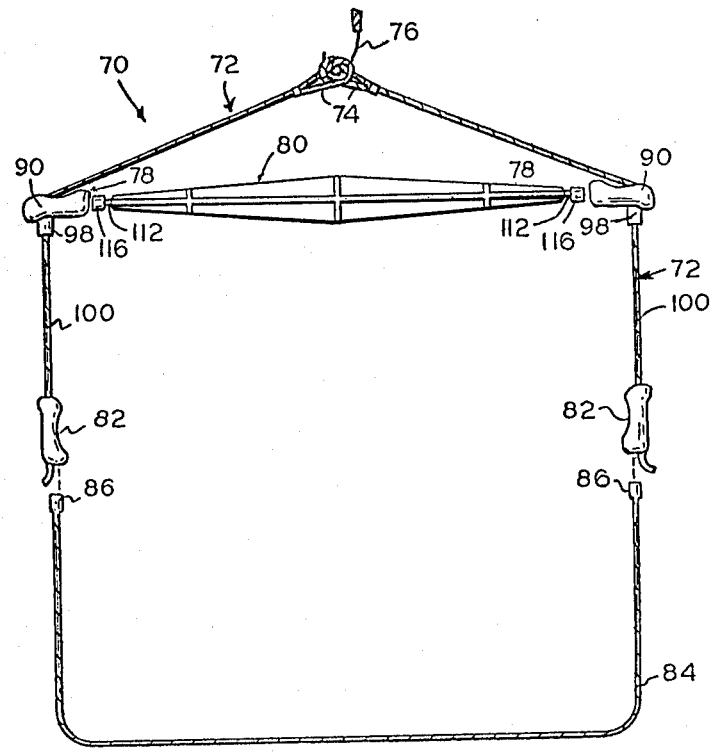
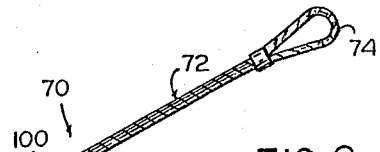
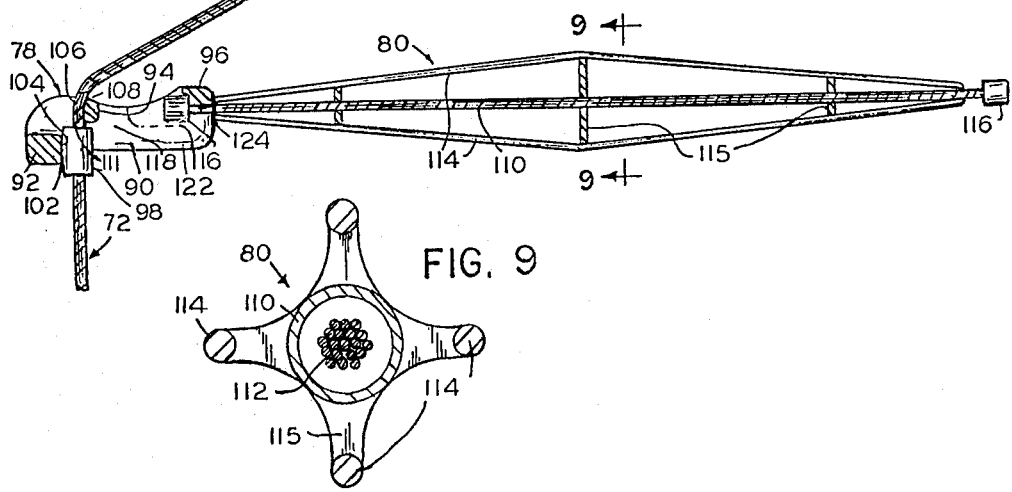

TAG LINE AND BUTT HOOK CONSTRUCTIONS

This is a continuation of my application Ser. No. 494,501, filed Aug. 5, 1974, which is a continuation of my application Ser. No. 354,696, filed Apr. 26, 1973, abandoned, which, in turn, is a continuation of my application Ser. No. 192,087, filed Oct. 26, 1971, abandoned.

DESCRIPTION

This invention relates to an improved tag line and butt hook constructions and more particularly to tag lines having butt hooks adapted to quickly and securely connect to choker or sling lines.

An object of the invention is to provide new and improved tag line and butt hook constructions.

Another object of the invention is to provide tag lines having butt hooks adapted to quickly and securely connect to choker or sling lines.

A further object of the invention is to provide a tag line having a plurality of butt hooks having quick-connect-disconnect portions and which are swiveled on ferrules on the tag line which lock choker lines to the butt hooks when the tag line is under tension.

Another object of the invention is to provide a butt hook having an upper end portion swiveled on and pivoted to a tag line and also having a lower end portion for holding a nubbin of a choker line and a transverse passage through which the nubbin can be moved for connecting and disconnecting the choker line to and from the butt hooks with the ferrule serving to block the passage when the tag line is tensioned.

Another object of the invention is to provide a tag line with a plurality of butt hooks to which choker lines can be quickly connected.

Another object of the invention is to provide an improved sling construction in which butt hooks connect a spreader bar to a pair of tag lines.

In the drawings

FIG. 2 is an enlarged, fragmentary elevation view taken along line 2—2 of FIG. 1;

FIG. 3 is an enlarged, fragmentary elevation view taken along line 3—3 of FIG. 1;

FIG. 5 is an enlarged vertical, sectional view taken along line 5—5 of FIG. 3;

FIG. 6 is an enlarged vertical, sectional view taken along line 6—6 of FIG. 3;

FIG. 7 is an elevation view of a sling construction forming an alternate embodiment of the invention;

FIG. 8 is an enlarged, fragmentary vertical sectional view of the sling construction of FIG. 7; and, FIG. 9 is an enlarged vertical sectional view taken along line 9—9 of FIG. 8.

EMBODIMENT OF FIGS. 1-6

Figure 1:
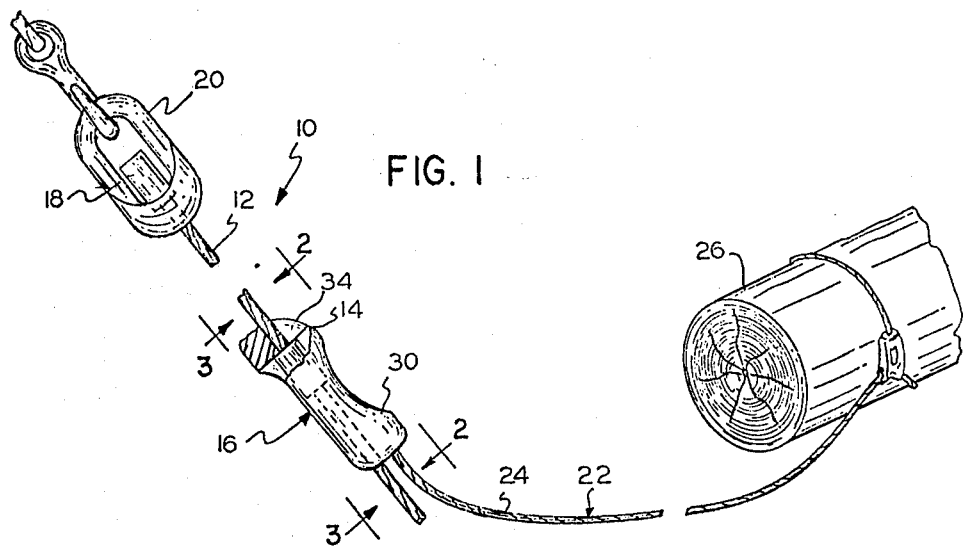
FIG. 1 is a top plan view of a tag line and choker hook construction forming one embodiment of the invention.

Referring now in detail to the drawings, there is shown therein an improved tag line and butt hook construction forming one embodiment of the invention and including a tag line 10 having a wire rope line 12, ferrules 14 swaged onto the line 12, butt hooks 16 swiveled on the line 12, a nubbin 18 swaged to one end of the line 12, and a swivel 20 at that end. Chokers 22 including wire rope lines 24 attachable to logs 26 in the usual manner are quickly and surely attachable to the butt hooks 16, nubbins or ferrules 28 swaged on the ends of the choker lines 24 and attaching the choker lines to the butt hooks and swiveling the choker lines to the butt hooks. The tag line with the chokers and logs comprise a turn adapted to be picked up by a helicopter, high lead or tractor.

Each butt hook 16 preferably is of steel and includes a solid body 30 having a transverse cylindrical passage 32 therethrough slightly above the midpoint of the body and of a diameter somewhat greater than that of the cylindrical nubbin 28 to permit the nubbin to be easily moved endwise through the passage 32 in attaching the choker 22 to and detaching the choker from the butt hook.

Figure 4:
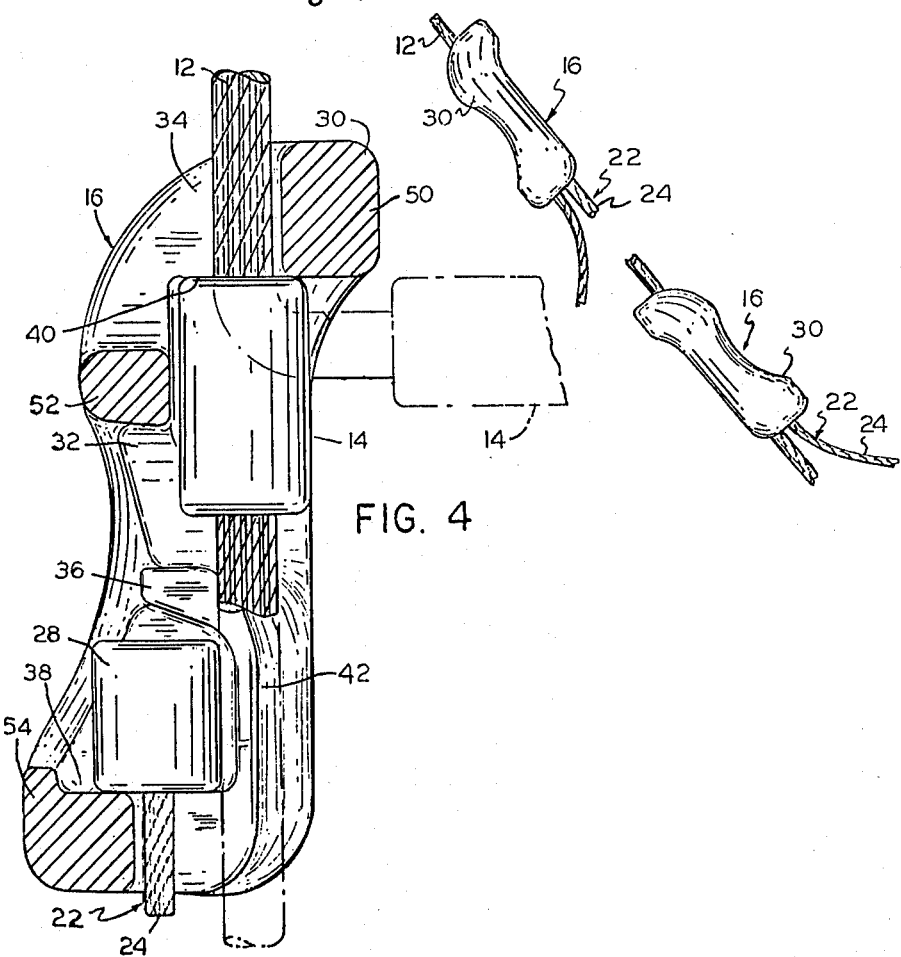
FIG. 4 is an enlarged vertical, sectional view taken along line 4—4 of FIG. 3.

To attach the choker to the butt hook, the ferrule 14 is swung in a counterclockwise direction, as viewed in FIG. 4, to the broken line position thereof in which the ferrule 14 clears the passage 32, a slot 34 permitting the portion of the line 12 above the ferrule to swing counterclockwise also. The nubbin 28 then is pushed endwise from right to left through the passage 32, the line 24 is allowed to laterally pass downwardly through a slot or gap 36, and the line 24 is pulled downwardly to pull the nubbin 28 into a socket 38 at the lower end of the butt hook to the operative position thereof as shown in FIG. 4. The ferrule 14 and line 12 then are swung to their full line positions shown in FIG. 4, in which position the ferrule 14 blocks the passage 32 to prevent accidental withdrawal of the nubbin 28 through the passage. The ferrule 14 seats in a socket 40 and, whenever the line 12 is tensioned, the portion of the line 12 just below the ferrule 14 lies in a slot 42 and laterally abuts the nubbin 28, the portion of the slot 42 co-extensive with the socket 38 being much narrower than the nubbin 28.

In effect, each butt hook 16 may be considered to be two heavy, plate-like side members rigidly connected together by three heavy bridges 50, 52 and 54. The corners of the bridges and side plates are rounded to prevent chafing.

The turn is picked up by hooking the swivel 20 to the towing apparatus. The turn can be preassembled very quickly and the tag line surely holds the chokers, which are quickly and easily attached thereto and detached therefrom, the butt hooks 16 being swiveled to the tag line and the chokers being swiveled to the butt hooks.

EMBODIMENTS OF FIGS. 7-9

A sling construction 70 forming an alternate embodiment of the invention includes a pair of tag lines 72 having looped ends 74 for engagement by a hook 76 of a crane. Butt hooks 78 connect the tag lines to a spreader bar 80, and butt hooks 82 connect the lower ends of the tag lines to a sling 84 having nubbins 86 on its ends. The butt hooks 82 are identical to the butt hooks 16, and the butt hooks 78 are very similar thereto. Each butt hook 78 includes side members 90 and bridges 92, 94 and 96. Nubbin 98 on wire rope 100 of the tag line seats in a socket-like portion 102 and laterally abuts elongated portion 104 of the bridge 92. The upper end of the nubbin 98 abuts the bridge 94 and portion 106 of the wire rope 100 lies in groove 108 and curves around and bears against arcuate side 110 of the groove 108 to prevent the butt hooks from turning counter-clockwise, as viewed in FIG. 8. The socket portion 102 of the bridge 92 prevents the butt hook from turning in a clockwise direction, as viewed in FIG. 8.

The spreader bar 80 (FIGS. 7, 8 and 9) is a compression member of light weight metal, and includes a tubular core 110, through which a wire rope or steel rod 112 extends, and also includes tapered ribs 114 and transverse gussets 115. Short nubbins 116 on the ends of the wire rope 112 are passed through transverse passages 118 in the butt hooks 78 and are drawn into sockets 120, the adjacent portions of the wire rope passing through narrow slots 122 in the butt hooks, lower corner portions 124 of the sides 90 being arcuate to permit the spreader bar to be swung to the position shown.

What is claimed is:

1. In combination, a tag line having a ferrule thereon, a choker line having a nubbin of a predetermined diameter, an elongated eye-like member having an enlarged transverse passage therethrough of a predetermined width sufficient to permit the nubbin to pass endwise therethrough and located generally at the central portion lengthwise of the member, said member also having a first slot of a width less than that of said nubbin and adapted to receive both the choker line and said tag line, the first slot extending along one side of the member from the passage to one end of the eye-like member, said member having a second slot extending along said one side of the member from the passage toward the other end of the member for receiving the ferrule on the tag line in a position blocking the passage to prevent accidental withdrawal of the nubbin through the passage, the member having a socket at the end portion of the first slot for receiving the nubbin on the choker line, the member also having an eye-like opening from the second slot to said other end for the tag line and adapted to prevent passage of the ferrule therethrough, the ferrule being of such a length and diameter as to block the passage when in the second slot, a bridge on the other side of said member, spaced from said other end of said member and closing one side of the second slot and forming one side of a socket for receiving the ferrule, the bridge forming one side of the passage, the ferrule being positioned on the tag line intermediate the ends of the tag line and a pulling portion of the tag line at one end of the ferrule extending through the eye-like opening to hold the ferrule in the second slot in a position blocking the passage, the member having opposed projections spaced apart a distance less than the diameter of the nubbin and positioned between the passage and the socket to form the side of the passage opposite to the bridge.

2. In combination, a pair of parallel side members extending generally vertically, a first bridge connecting the upper ends of the side members at one side, a tag line rope, a ferrule of a predetermined diameter on the tag line rope, a second bridge at the other side of the side members and being positioned below the first bridge and connecting the upper end portions of the side members and forming an eye for the tag line rope with the first bridge and the adjacent portions of the side members, and a third bridge connecting the lower ends of the side members at a said other side, the first and second bridges and portions of the side members defining a first socket open at said one side for receiving the upper portion of the ferrule on the tag line, a choker line including a rope and a nubbin of a predetermined diameter, the second bridge and the portions of the side members below the second bridge defining a transverse passage for the nubbin of the choker line permitting the nubbin to pass therethrough only when the ferrule has been moved out of the socket and pivoted from a normal position extending longitudinally of the hook to a second position extending transversely of the hook, the second bridge being positioned below the first bridge sufficiently to permit the portion of the tag line rope adjacent the ferrule to extend substantially transversely of the hook when the ferrule is in said second position thereof, the side members having opposed, spaced, lateral projections forming the lower portion of the passage, said lateral projections being positioned at said one side of said side members and defining a slot through which the rope of the choker line can pass laterally after the nubbin has been moved through the passage, the projections also extending downwardly along the side members to define a slot for the choker line rope, the third bridge, the projections and the adjacent portions of the side members forming a second socket for receiving the nubbin of the choker line.

3. The combination of claim 2 wherein the second socket is offset laterally from the first socket, and the side members and the third bridge define a slot for receiving both the choker line rope and the tag line rope and permit the tag line rope to extend substantially straight past the nubbin.

4. The combination of claim 3 wherein both the second and third bridges are at the side of the side members opposite to said one side.

* * * * *